US012480344B2

(12) United States Patent
Balci et al.

(10) Patent No.: US 12,480,344 B2
(45) Date of Patent: Nov. 25, 2025

(54) FITTING ASSEMBLY FOR ARRANGING BETWEEN A FIXED FRAME AND A LEAF OF A WINDOW OR DOOR

(71) Applicant: Roto Frank Fenster—und Türtechnologie GmbH, Leinfelden-Echterdingen (DE)

(72) Inventors: Erkan Balci, Filderstadt (DE); Nyikos Tamás, Sopron (HU)

(73) Assignee: Roto Frank Fenster—und Türtechnologie GmbH, Leinfelden-Echterdingen (DE)

( * ) Notice: Subject to any disclaimer, the term of this patent is extended or adjusted under 35 U.S.C. 154(b) by 0 days.

(21) Appl. No.: 18/973,061

(22) Filed: Dec. 8, 2024

(65) Prior Publication Data

US 2025/0101784 A1 Mar. 27, 2025

Related U.S. Application Data

(63) Continuation of application No. PCT/EP2023/064706, filed on Jun. 1, 2023.

(30) Foreign Application Priority Data

Jun. 10, 2022 (DE) ..................... 10 2022 114 632.4

(51) Int. Cl.
*E05D 15/10* (2006.01)

(52) U.S. Cl.
CPC ...... *E05D 15/10* (2013.01); *E05D 2015/1026* (2013.01); *E05D 2015/1039* (2013.01);
(Continued)

(58) Field of Classification Search
CPC ................ E05D 2015/1026; E05D 2015/1039
See application file for complete search history.

(56) References Cited

U.S. PATENT DOCUMENTS 1,983,959 A 12/1934 Wuebling
2,650,387 A 9/1953 Foss
(Continued)

FOREIGN PATENT DOCUMENTS

AT 365994 B 2/1982
DE 8612833 U1 7/1986
(Continued)

*Primary Examiner* — Catherine A Kelly
(74) *Attorney, Agent, or Firm* — Orbit IP, LLP; Marc G. Martino

(57) ABSTRACT

A fitting assembly for arranging between a fixed frame and a leaf of a window or a door includes a transverse guide, a lift-off drive and a longitudinal guide. A leaf-side transverse guide part of the transverse guide can be moved into a lifting-off position by the lift-off drive, in a lifting-off direction running perpendicular to a frame main plane of the fixed leaf, relative to a fixed-frame-side transverse guide part. The fixed-frame-side transverse guide part is movably guided, as part of the longitudinal guide, on a longitudinal guide path of the longitudinal guide, along the frame main plane in a shifting direction. A spring element is arranged between the leaf-side transverse guide part and the fixed-frame-side transverse guide part, which spring element is pre-tensioned perpendicular to the frame main plane when the leaf-side transverse guide part is in the lifting-off position.

9 Claims, 5 Drawing Sheets

(52) U.S. Cl.
CPC ..... *E05Y 2201/474* (2013.01); *E05Y 2201/48* (2013.01); *E05Y 2201/682* (2013.01); *E05Y 2201/686* (2013.01); *E05Y 2900/132* (2013.01); *E05Y 2900/148* (2013.01)

(56) References Cited

U.S. PATENT DOCUMENTS

| | | | | |
|---|---|---|---|---|
| 5,349,783 | A | 9/1994 | Jasperson et al. | |
| 5,678,280 | A | 10/1997 | Haab et al. | |
| 8,438,783 | B2 * | 5/2013 | Giovannetti | E05D 15/10 49/130 |
| 10,077,594 | B2 * | 9/2018 | Fingerle | E05B 65/087 |
| 11,085,216 | B2 * | 8/2021 | Reich | E05D 15/10 |
| 11,098,513 | B2 * | 8/2021 | Liu | E06B 7/16 |
| 11,428,033 | B2 * | 8/2022 | Beutel | E05D 15/10 |
| 12,084,911 | B2 * | 9/2024 | Lee | E05D 15/06 |
| 12,104,418 | B1 * | 10/2024 | Krebs | E05D 15/10 |
| 12,180,763 | B2 * | 12/2024 | Lee | E05C 9/1808 |
| 2016/0145932 | A1 | 5/2016 | Fingerle | |
| 2019/0345749 | A1 * | 11/2019 | Reich | E05D 15/10 |
| 2023/0366251 | A1 * | 11/2023 | Reich | E05C 9/1858 |
| 2023/0383583 | A1 * | 11/2023 | Reich | E05D 15/0665 |

FOREIGN PATENT DOCUMENTS

| | | | | |
|---|---|---|---|---|
| DE | 37 16 876 | A1 | 12/1988 | |
| DE | 199 54 111 | A1 | 5/2001 | |
| DE | 10 2010 010 810 | A1 | 6/2011 | |
| DE | 102017220895 | A1 * | 5/2019 | E05D 15/1005 |
| DE | 202021100989 | U1 * | 5/2022 | E05C 9/006 |
| EP | 0 675 252 | A1 | 10/1995 | |
| EP | 1 394 347 | A1 | 3/2004 | |
| EP | 2 829 679 | A1 | 1/2015 | |
| EP | 2871312 | A1 * | 5/2015 | E05D 15/10 |
| GB | 188 228 | A | 11/1922 | |
| GB | 2547197 | A | 8/2017 | |

* cited by examiner

FITTING ASSEMBLY FOR ARRANGING BETWEEN A FIXED FRAME AND A LEAF OF A WINDOW OR DOOR

CROSS-REFERENCE TO RELATED APPLICATIONS

This continuation application claims priority to PCT/EP2023/064706 filed on Jun. 1, 2023 which has published as WO 2023/237413 A1 and also the German application number DE 10 2022 114 632.4 filed on Jun. 10, 2022, the entire contents of which are fully incorporated herein with these references.

DESCRIPTION

Field of the Invention

The invention relates to a fitting assembly for arranging between a fixed frame and a leaf of a window or a door, by means of which the leaf can be driven relative to the fixed frame with a guided lifting-off movement in a lifting-off direction perpendicular to a frame main plane of the fixed frame and can thereby be lifted off from a position close to the fixed frame to a position away from the fixed frame and by means of which the leaf lifted off into the position away from the fixed frame can be displaced relative to the fixed frame with a guided shifting movement in a shifting direction perpendicular to the lifting-off direction along the frame main plane, in that the fitting assembly comprises a transverse guide, a lift-off drive and a longitudinal guide; wherein the transverse guide of the fitting assembly has a leaf-side transverse guide part and a fixed-frame-side transverse guide part, and the leaf-side transverse guide part is designed for movement-related connection with the leaf moving in the lifting-off direction and is movably guided on the fixed-frame-side transverse guide part in the lifting-off direction; wherein the lift-off drive of the fitting assembly comprises a leaf-side drive element and a leaf lift-off controller; wherein the leaf-side drive element of the lift-off drive is designed for movement-related connection with the leaf moving in the lifting-off direction and for carrying out a lift-off drive movement relative to the leaf; wherein the leaf lift-off controller comprises a leaf-side control element connected to the leaf-side drive element and a guide-part-side control element provided on the fixed-frame-side transverse guide part; wherein of the leaf-side control element and the guide-part-side control element of the leaf lift-off controller, one control element is designed as a control link and the other control element is designed as a link follower guided by means of the control link; wherein the control link of the leaf lift-off controller extends with a longitudinal direction thereof along the frame main plane and at a varying distance from the frame main plane and has link walls extending along the frame main plane which are spaced apart from one another perpendicular to the frame main plane; wherein the link follower penetrates into the control link and; wherein due to the lift-off drive movement of the leaf-side drive element, the control link and the link follower are movable relative to one another in the longitudinal direction of the control link and as a result the leaf-side transverse guide part can be moved relative to the fixed frame-side transverse guide part from a position associated with the position of the leaf close to the fixed frame perpendicular to the frame main plane into a lifting-off position associated with the position of the leaf away from the fixed frame due to the course of the control link guiding the link follower; and wherein the longitudinal guide of the fitting assembly comprises a fixed-frame-side longitudinal guide path which extends in the shifting direction of the leaf and on which the fixed-frame-side transverse guide part is movably guided in the shifting direction of the leaf together with the leaf-side transverse guide part which is moved into the lifting-off position.

The invention further relates to a window or a door having such a fitting assembly.

Background of the Invention

Prior art of the generic type is known from EP 2 829 679 A1. This document relates to a window or a door with a leaf which, by means of a displacement assembly, can be lifted off relative to a fixed frame perpendicular to a frame main plane of the fixed frame and, in the lifted-off state, can be displaced in a shifting direction parallel to the frame main plane. The displacement assembly comprises a drive rod fitting mounted on the leaf and fixed-frame-side guide parts which are movable on the fixed frame parallel to the frame main plane in the shifting direction of the leaf and are supported perpendicular to the frame main plane. The connection between the leaf and the fixed-frame-side guide parts is established by leaf fastening parts of the displacement assembly, one of which is screwed to the leaf on the one hand and, on the other hand, is movably guided on the associated fixed-frame-side guide part perpendicular to the frame main plane. In order to lift off the leaf relative to the fixed frame, drive rods of the drive rod fitting are provided with control pins on the leaf which drive rods are movable in the circumferential direction of the leaf, each of which control pins engages in a control link on one of the fixed-frame-side guide parts. On the basis of an actuation of the drive rod fitting, a control pin on the drive rod side moves in the longitudinal direction of the control link on the associated guide part on the fixed-frame side. Since the control link on the guide part on the fixed-frame side extends in the direction of movement of the control pin with increasing distance from the frame main plane, the displacement of the control pin in the control link causes a lifting-off movement of the leaf connected to the control pin relative to the guide part on the fixed-frame side perpendicular to the frame main plane. By means of the leaf fastening parts, the leaf is guided along the guide parts on the fixed-frame side during its lifting-off movement. The leaf arranged in a position away from the fixed frame can be manually moved in the shifting direction relative to the fixed frame.

SUMMARY OF THE INVENTION

The object of the present invention is to further develop the generic state of the art in such a way that the guidance of the leaf away from the fixed frame, which is effective perpendicular to the frame main plane, is improved during its shifting movement.

According to the invention, this object is achieved by the fitting assembly according to the independent claims.

The spring element provided in the case of the invention between the leaf-side transverse guide part and the fixed-frame-side transverse guide part and pre-tensioned perpendicular to the frame main plane when the leaf is lifted off ensures that the leaf-side control element of the leaf lift-off controller is supported without play on the guide-part-side control element of the leaf lift-off controller. In other words, the effect of the pre-tensioned spring element minimizes play existing perpendicular to the frame main plane between the leaf-side transverse guide part and the fixed frame-side transverse guide part when a shifting movement is carried out in the shifting direction along the frame main plane by the leaf-side transverse guide part arranged in the lifting-off position and the leaf connected to the same.

The leaf-side control element of the leaf lift-off controller is connected to the leaf-side drive element, which in turn is connected to the leaf so as to be movable jointly with the leaf moving perpendicular to the frame main plane. The control element of the leaf lift-off controller on the guide-part side is provided on the transverse guide part on the fixed frame side. The transverse guide part on the fixed-frame side is in turn guided in the shifting direction on the longitudinal guide path provided for guiding the lifted-off leaf in the shifting direction and is consequently mounted on the longitudinal guide path of the parallel guide perpendicular to the frame main plane.

Consequently, the play-free support of the leaf-side control element on the guide-part-side control element of the leaf lift-off controller, as effected according to the invention, results in a play-free or at least play-reduced support of the leaf lifted off relative to the fixed frame on the longitudinal guide path perpendicular to the frame main plane, and this even when the lifted-off leaf is moved along the longitudinal guide path in the shifting direction.

With appropriate geometry of the leaf-side control element and the guide-part-side control element of the leaf lift-off controller, the pre-tensioned spring element also causes a play-free mutual support of the leaf-side control element and the guide-part-side control element, due to which a play along the frame main plane and/or a rotational play is eliminated between the leaf-side control element and the guide-part-side control element and consequently also between the leaf-side transverse guide part and the fixed-frame-side transverse guide part.

Particular embodiments of the fitting assembly according to the first independent claim, and of the window or door according to the second independent claim are found in the dependent claims.

According to a dependent claim, the spring element according to the invention between the leaf-side transverse guide part and the fixed-frame-side transverse guide part is advantageously pre-tensioned due to the lift-off drive movement, with which the drive element of the lift-off drive is moved jointly with the leaf-side control element of the leaf lift-off controller attached to the drive element relative to the fixed-frame-side transverse guide part and the guide part-side control element provided on it. The lifting-off movement of the leaf relative to the fixed frame thus leads directly to the build-up of the pre-tension of the spring element between the leaf-side transverse guide part and the fixed-frame-side transverse guide part and thus to a play-free or play-reduced mounting, perpendicular to the frame main plane, of the leaf lifted off relative to the fixed frame during the shifting movement of the leaf along the longitudinal guide path.

According to another dependent claim, in a further advantageous embodiment of the invention the leaf-side transverse guide part is designed in several parts. During the lifting-off movement of the leaf, the leaf-side transverse guide part is guided by means of a base body to the fixed-frame-side transverse guide part. A spring support of the leaf-side transverse guide part, which is structurally separate from the base body, supports the spring element pre-tensioned between the leaf-side transverse guide part and the fixed-frame-side transverse guide part on one side. With a spring support of the type according to the invention, leaf-side transverse guide parts of conventional transverse guides for leaves able to be lifted off and parallel-shiftable leaves can be easily retrofitted for the use of spring elements according to the invention.

In the case of the fitting assembly according to the invention according to another dependent claim, the leaf-side control element of the leaf lift-off controller is designed as a guide follower movable along the frame main plane of the fixed frame, preferably as a control pin. The control link of the leaf lift-off controller is provided on the fixed-frame-side transverse guide part. In order to generate a lifting-off movement of the leaf perpendicular to the frame main plane, the control link extends in the direction of the lift-off drive movement of the leaf-side drive element of the lift-off drive with increasing distance from the frame main plane. In general, the course of the control link is selected in such a way that when the leaf is lifted off, the link follower and the control link do not carry out any relative movement in the longitudinal direction of the control link under the effect of the spring pretension that is then built up and, consequently, the leaf is not returned to its fixed-frame-side position.

In a preferred embodiment of the invention, a drive rod is provided as the leaf-side drive element of the lift-off drive for the leaf, which drive rod is moved on the leaf in a leaf-side guide groove with the lift-off drive movement along the frame main plane, preferably by means of a conventional operating handle of the fitting assembly according to the invention. On a leaf profile made of aluminum, the drive rod is guided at guide groove walls of the guide groove which guide groove walls are spaced apart perpendicularly to the frame main plane. On a leaf profile made of plastic or wood, the drive rod is guided on a faceplate which is connected to the leaf profile, preferably screwed thereto, and which is therefore attached to the leaf profile without any play in the transverse direction of the frame main plane. The pre-tensioned spring element between the leaf-side transverse guide part and the fixed-frame-side transverse guide part ensures, on the one hand, a play-free mounting of the leaf-side control element of the leaf lift-off controller on the guide-part-side control element perpendicular to the frame main plane and, in addition, perpendicular to the frame main plane a play-free mounting of the drive rod provided with the leaf-side control element on one of the guide groove walls of the leaf or on the faceplate connected to the leaf. The play-free mounting of the drive rod on the relevant guide groove wall of the leaf-side guide groove for the drive rod or on the faceplate results in a further reduction of the guide play of the leaf away from the fixed frame, which occurs perpendicular to the frame main plane when the leaf away from the fixed frame is moved with a shifting movement along the frame main plane. With appropriate geometry of the leaf-side control element and the guide-part-side control element of the leaf lift-off controller, play along the frame main plane and/or rotational play is also prevented between the leaf-side transverse guide part and the fixed-frame-side transverse guide part.

Conventional spring designs are particularly suitable for the spring element according to the invention. In the case of the inventive designs of further dependent claims, a helical and/or a leaf spring is provided as the spring element for the sake of simplicity. A leaf spring can be attached to a multi-part leaf-side transverse guide part according to another dependent claim, for example, by means of fastening screws, which then serve as a spring support.

In the following, the invention is explained in more detail on the basis of schematic illustrations given by way of example.

DETAILED DESCRIPTION OF EMBODIMENTS OF THE INVENTION

Figure 1:
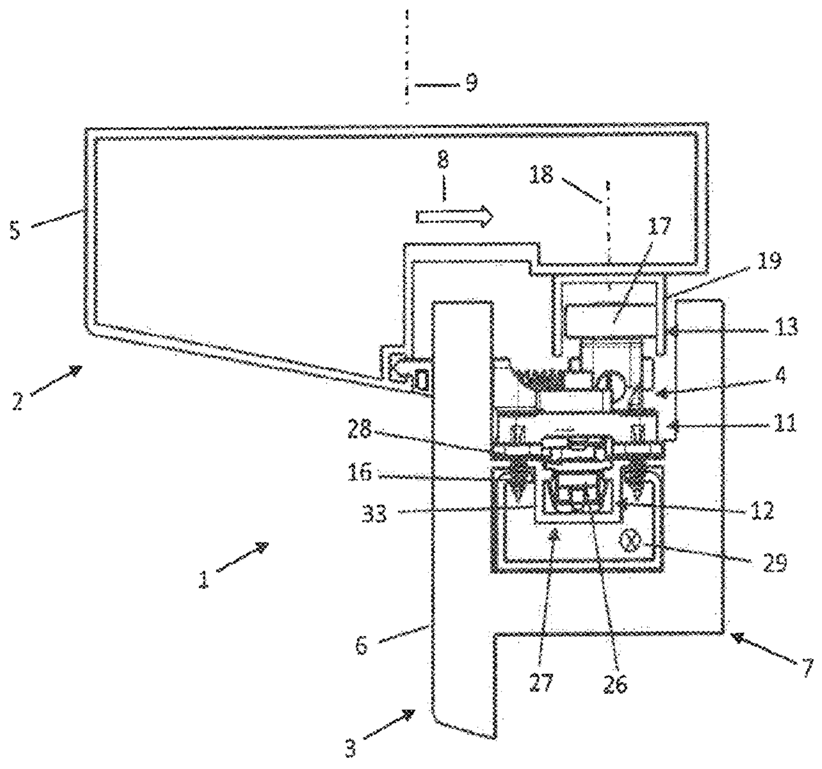
FIG. 1 shows a sectional view of a window comprising a fixed frame and a leaf in a position close to the fixed frame and with a fitting assembly arranged between the fixed frame and the leaf in a first functional state.
Figure 5:
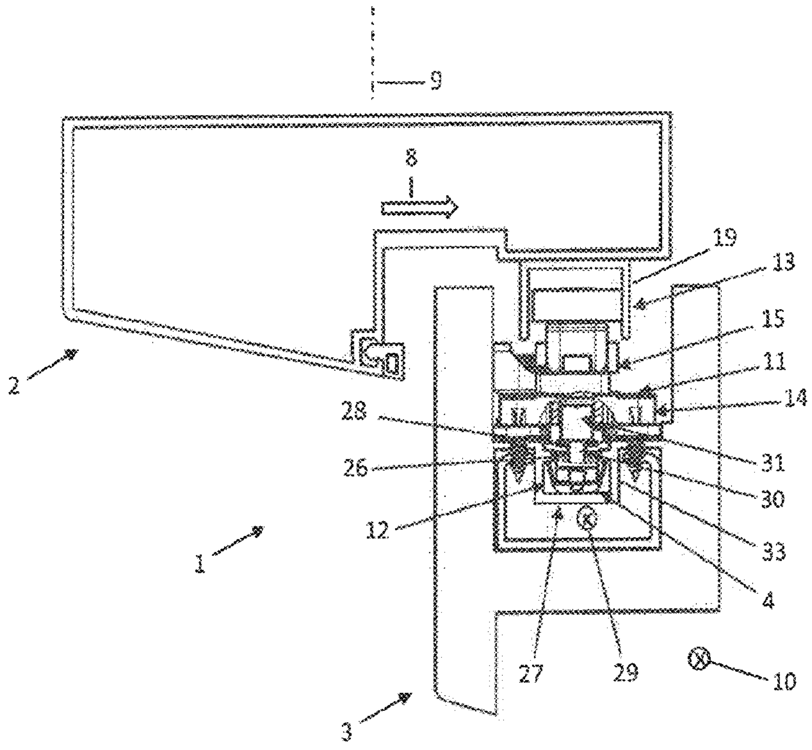
FIG. 5 shows a sectional view of the window according to FIG. 1 with the fitting assembly according to FIG. 1 in a second functional state.

As shown in FIGS. 1 and 5, a window 1 designed as a sliding window comprises a fixed frame 2, a leaf 3 and a fitting assembly 4 arranged between the fixed frame 2 and the leaf 3. An upper horizontal frame member 5 of the fixed frame 2 and an upper horizontal frame member 6 of a leaf frame 7 of the leaf 3 are shown.

By means of the fitting assembly 4, the leaf 3 can be driven relative to the fixed frame 2 with a guided lifting-off movement in a lifting-off direction (arrow 8) perpendicular to a frame main plane 9 of the fixed frame 2 indicated by dash-dotted lines in FIGS. 1 and 5 and can thus be lifted off from a position close to the fixed frame (FIG. 1) to a position away from the fixed frame (FIG. 5). In addition, the fitting assembly 4 makes possible a horizontal shifting movement of the leaf 3 when it is in the position away from the fixed frame. A shifting direction 10 of the leaf 3 directed into the drawing planes of FIGS. 1 and 5 is indicated in FIG. 5 and extends perpendicular to the lifting-off direction 8 along the frame main plane 9.

To implement the above-mentioned functions, the fitting assembly 4 comprises a transverse guide 11, a lift-off drive 12, and a longitudinal guide 13.

The transverse guide 11 of the fitting assembly 4 is shown in detail in FIGS. 2 to 4 and 6 to 8.

Figure 2:
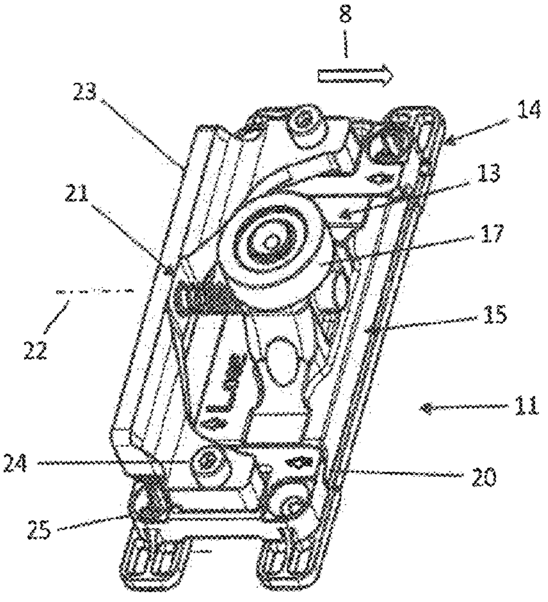
FIG. 2 shows a transverse guide of the fitting assembly according to FIG. 1 comprising a leaf-side transverse guide part and a fixed-frame-side transverse guide part.
Figure 3:
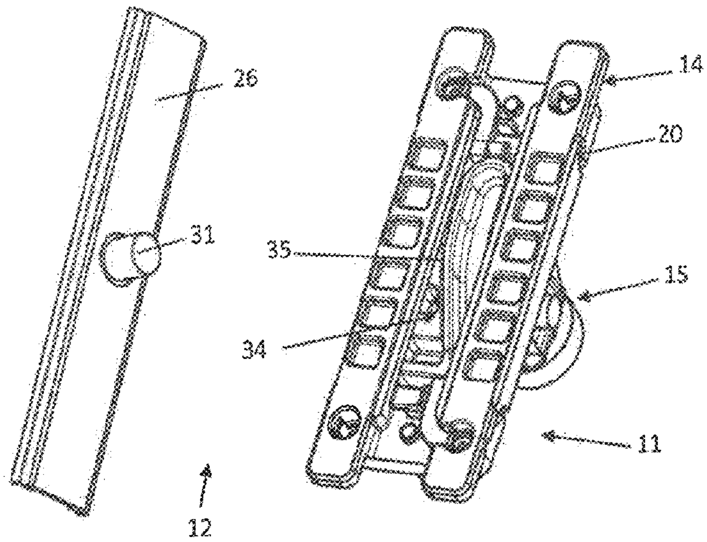
FIG. 3 shows the transverse guide according to FIG. 2 in the view of the underside of the transverse guide facing away from the viewer of FIG. 2 as well as a drive rod with control pin for use on the transverse guide.
Figure 4:
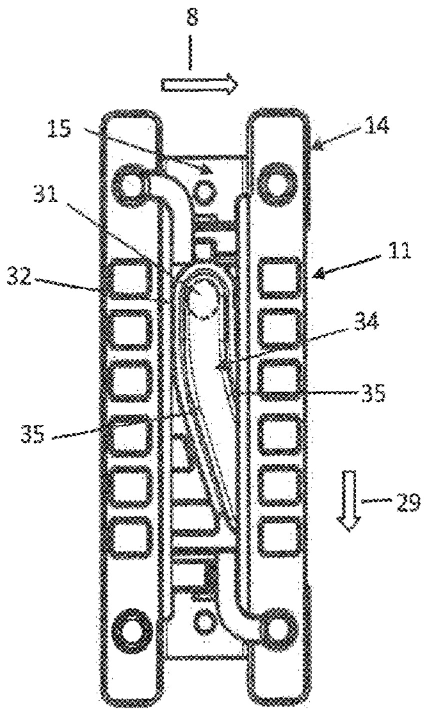
FIG. 4 shows the transverse guide according to FIG. 3 in the vertical view and with the indicated control pin according to FIG. 3 inside a control link on the fixed-frame-side transverse guide part.
Figure 6:
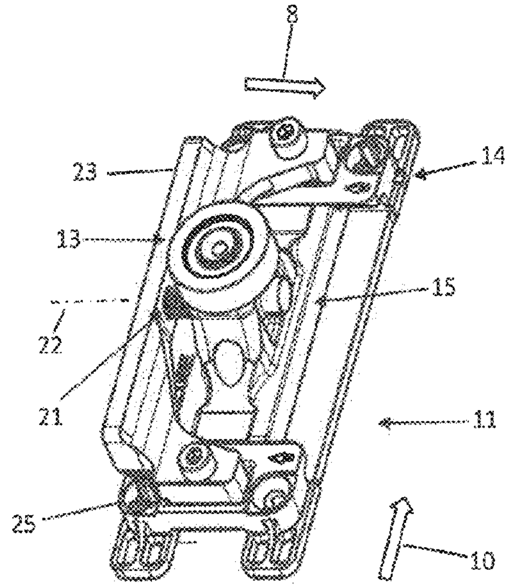
FIGS. 6 to 8 show illustrations corresponding to FIGS. 2 to 4 of the transverse guide of the fitting assembly according to FIG. 5.
Figure 7:
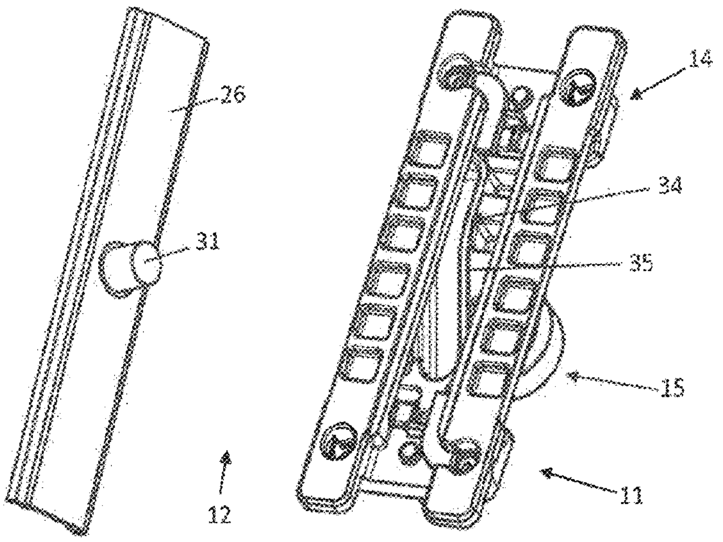
Figure 8:
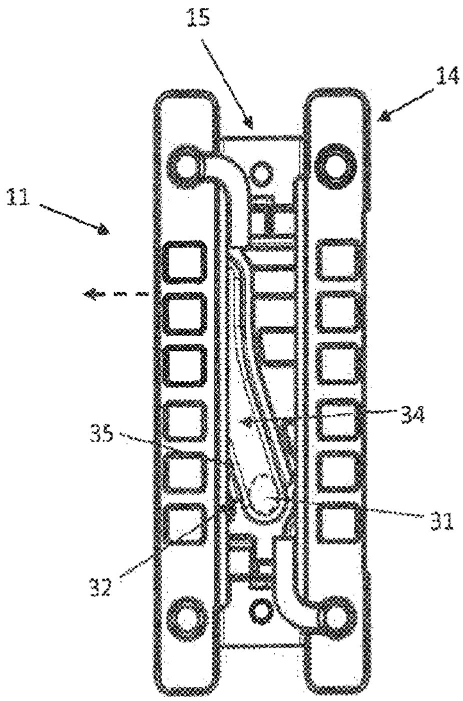

FIGS. 2 to 4 show the transverse guide 11 in a first functional state of the fitting assembly 4, in which the leaf 3 assumes its position close to the fixed frame and is locked to the fixed frame 2. In FIGS. 6 to 8, the fitting assembly 4 and the transverse guide 11 are in a second functional state. In this second functional state of the fitting assembly 4, the leaf 3 is unlocked from the fixed frame 2 and is lifted off in a position away from the fixed frame in the lifting-off direction 8 relative to the fixed frame 2.

The transverse guide 11 of the fitting assembly 4 has a leaf-side transverse guide part 14 and a fixed-frame-side transverse guide part 15. The leaf-side transverse guide part 14 is screwed to the leaf 3 by means of four fastening screws 16 (FIG. 1). The fixed-frame-side transverse guide part 15 is provided with a guide roller 17 which can rotate about a roller rotation axis 18 extending parallel to the frame main plane 9. By means of the guide roller 17, the fixed-frame-side transverse guide part 15 is movably guided on a longitudinal guide path of the longitudinal guide 13 formed by a guide rail 19 in the shifting direction 10 of the leaf 3. The guide rail 19 is connected to the fixed frame 2.

Transverse edges 20 of the fixed-frame-side transverse guide part 15 extending in the lifting-off direction 8 are overlapped by the leaf-side transverse guide part 14 screwed to the leaf 3. Due to the resulting dovetail-like guidance, the leaf-side transverse guide part 14 and with it also the leaf 3 are movably guided in the lifting-off direction 8 on the fixed-frame-side transverse guide part 15.

A spring element is arranged between the leaf-side transverse guide part 14 and the fixed-frame-side transverse guide part 15, which spring element in the case of the fitting assembly 4 according to FIGS. 1 to 8 is designed as a helical spring 21.

A screw axis 22 of the helical spring 21 extends perpendicular to the frame main plane 9. The helical spring 21 is mounted with one axial end on the fixed-frame-side transverse guide part 15 and with the other axial end on the leaf-side transverse guide part 14. For this purpose, the leaf-side transverse guide part 14 has a spring support 23 which is mounted by means of fastening screws 24 to a base body 25 of the leaf-side transverse guide part 14.

The lift-off drive 12 of the fitting assembly 4 serves to generate the lifting-off movement of the leaf 3 relative to the fixed frame 2 in the lifting-off direction 8.

Details of the lift-off drive 12 can be found in FIGS. 3 and 4 for the functional state of the fitting assembly 4 illustrated in FIG. 1 and in FIGS. 7 and 8 for the functional state of the fitting assembly 4 shown in FIG. 5.

The lift-off drive 12 comprises a drive rod 26 as a leaf-side drive element, which drive rod 26, as shown in FIGS. 1 and 5, is accommodated in the usual way in a fitting groove 27. The fitting groove 27 extends on the leaf 3 in the circumferential direction of the rebate. As usual, the drive rod 26 is covered by a faceplate 28 screwed to the leaf 3. The faceplate 28 is screwed to the frame member 6 of the leaf frame 7. The drive rod 26 can be displaced relative to the faceplate 28 by conventional actuation of the handle (not shown) of the fitting assembly 4 with a lift-off drive movement. A direction 29 of the lift-off drive movement of the drive rod 26 directed into the drawing planes of FIGS. 1 and 5 is illustrated in FIGS. 1 and 5.

When moving in the direction 29 of the lift-off drive movement, the drive rod 26 is guided on the faceplate 28. For this purpose, a shaft 30 riveted to the drive rod 26 of a control pin 31 attached to the drive rod 26 passes through a slot in the faceplate 28 extending in the direction 29 of the lift-off drive movement (FIG. 5). The control pin 31, which is radially extended relative to the shaft 30, covers the longitudinal edges of the guide slot provided on the faceplate 28 for the shaft 30 and the drive rod 26.

The control pin 31 forms a leaf-side control element of a leaf lift-off controller 32 of the lift-off drive 12. The control pin 31 is mounted on the leaf 3 perpendicular to the frame main plane 9 via the shaft 30 and the faceplate 28. The fitting groove 27 therefore forms a leaf-side guide groove for the drive rod 26, while the groove walls 33 are provided as guide groove walls.

The control pin 31 provided as the leaf-side control element of the leaf lift-off controller 32 is associated with a control link 34 provided on the fixed-frame-side transverse guide part 15 as the guide-part-side control element.

The control link 34 extends on the fixed frame-side transverse guide part 15 in a longitudinal direction along the frame main plane 9 and has a link opening with link walls 35 which are spaced apart from one another perpendicular to the frame main plane 9. When the fitting assembly 4 is mounted on the leaf 3, the control pin 31 of the leaf-side drive rod 26 penetrates parallel to the frame main plane 9 into the guide opening of the control link 34 on the fixed-frame-side transverse guide part 15. The control link 34 extends in the direction 29 of the lift-off drive movement of the drive rod 26 and of the control pin 31 with increasing distance from the frame main plane 9.

FIG. 4 shows the position of the control pin 31 in the control link 34 in the functional state of the fitting assembly 4 illustrated in FIG. 1. The leaf 3 is located opposite the fixed frame 2 in the position close to the fixed frame. The helical spring 21 provided between the leaf-side transverse guide part 14 and the fixed-frame-side transverse guide part 15 is relaxed. The control pin 31 is located in the control link 34 at the upper end of the link opening in FIG. 4.

If, based on these conditions, the drive rod 26 is displaced relative to the leaf 3 in the direction 29 of the lift-off drive movement by actuation of the handle of the fitting assembly 4, the leaf 3 will be unlocked from the fixed frame in the usual way. At the same time, the control pin 31 moves inside the control link 34 as a link follower from the position according to FIG. 4 to the position according to FIG. 8. The control pin 31 drives the leaf 3 in the opening direction 8 via the drive rod 26 supported on the leaf 3 perpendicular to the frame main plane 9. The leaf 3 and the leaf-side transverse guide part 14 screwed to it move relative to the fixed-frame-side transverse guide part 15 until the leaf 3 has reached its position away from the fixed frame shown in FIG. 5. In the position away from the fixed frame, the leaf 3 is free from the fixed frame 2. As a result, the leaf 3 can be displaced relative to the fixed frame 2 along the fixed-frame-side guide rail 19 in the shifting direction 10.

Due to the movement of the leaf 3 and of the leaf-side transverse guide part 14 screwed to it, that is caused by the drive rod 26 and the leaf lift-off controller 32, relative to the fixed frame-side transverse guide part 15 which is stationary during the movement of the leaf 3 and of the leaf-side transverse guide part 14 in the lifting-off direction 8, the helical spring 21 is compressed between the leaf-side transverse guide part 14 and the fixed-frame-side transverse guide part 15. The helical spring 21 is shown in FIG. 6 in the compressed and thus pre-tensioned state.

As a result of the pretension of the helical spring 21, the control pin 31 is pressed against the link wall of the control link 34 in the direction of action (dashed arrow in FIG. 8) of the compressed helical spring 21. Due to the course of the part of the link wall 35 acted upon by the control pin 31 under the action of the compressed helical spring 21, a play-free mounting of the control pin 31 on the transverse guide part 15 on the fixed-frame side, both perpendicular and parallel to the frame main plane 9, results.

The play-free mounting of the control pin 31 on the fixed-frame-side transverse guide part 15 and the play-free mounting of the control pin 31 on the leaf 3 result, in combination, in at most a slight play of the leaf 3 perpendicular to the frame main plane 9 when the leaf 3, which is lifted off into the position away from the fixed frame, is moved in the shifting direction 10 along the fixed-frame-side guide rail 19. In addition, play along the frame main plane 9 and rotational play are prevented between the leaf-side transverse guide part 14 coupled to the control pin 31 via the leaf 3 and the fixed-frame-side transverse guide part 15.

Figure 9:
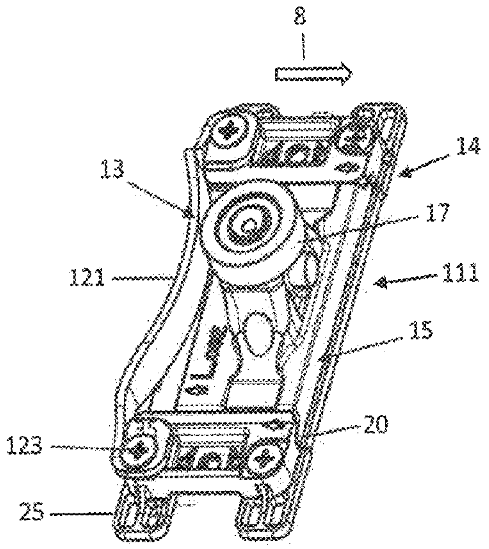
FIG. 9 shows a second type of transverse guide in a first functional state.
Figure 10:
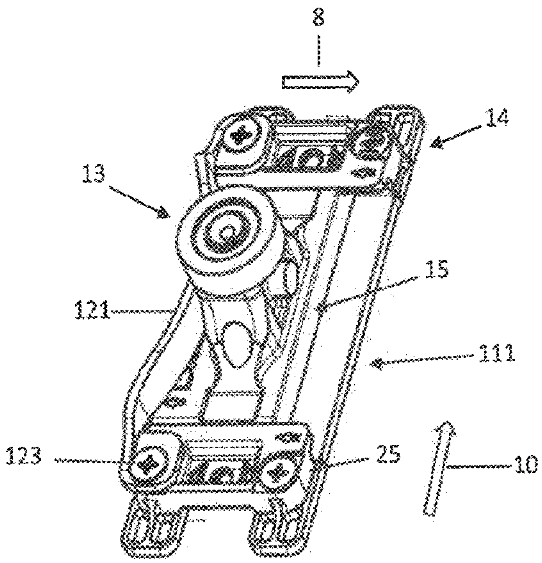
FIG. 10 shows the transverse guide according to FIG. 9 in a second functional state.

A transverse guide 111 of the fitting assembly 4 shown in FIGS. 9 and 10 differs from the transverse guide 11 according to FIGS. 1 to 8 only in that, instead of the helical spring 21, a leaf spring 121 is provided as a spring element between the leaf-side transverse guide part 14 and the fixed-frame-side transverse guide part 15. The leaf spring 121 is screwed to the base body 25 of the leaf-side transverse guide part 14 by means of fastening screws 123. The fastening screws 123 therefore form a spring support of the modified leaf-side transverse guide part 14.

What is claimed is:

1. A fitting assembly for arranging between a fixed frame and a leaf of a window or a door, wherein the leaf can be driven relative to the fixed frame with a guided lifting-off movement in a lifting-off direction perpendicular to a frame main plane of the fixed frame and can be lifted off from a position close to the fixed frame to a position away from the fixed frame and wherein the leaf lifted off into the position away from the fixed frame can be displaced relative to the fixed frame with a guided shifting movement in a shifting direction perpendicular to the lifting-off direction along the frame main plane, wherein the fitting assembly comprises:

a transverse guide, a lift-off drive and a longitudinal guide;

wherein the transverse guide of the fitting assembly has a leaf-side transverse guide part and a fixed-frame-side transverse guide part, and the leaf-side transverse guide part is designed for movement-related connection with the leaf moving in the lifting-off direction and is movably guided on the fixed-frame-side transverse guide part in the lifting-off direction;

wherein the lift-off drive of the fitting assembly comprises a leaf-side drive element and a leaf lift-off controller;

wherein the leaf-side drive element of the lift-off drive is designed for movement-related connection with the leaf moving in the lifting-off direction and for carrying out a lift-off drive movement relative to the leaf;

wherein the leaf lift-off control comprises a leaf-side control element connected to the leaf-side drive element and a guide-part-side control element provided on the fixed-frame-side transverse guide part;

wherein of the leaf-side control element and the guide part-side control element of the leaf lift-off controller, one control element is designed as a control link and the other control element is designed as a link follower guided by the control link;

wherein the control link of the leaf lift-off controller extends with a longitudinal direction thereof along the frame main plane and at a varying distance from the frame main plane and has link walls extending along the frame main plane, which are spaced apart from one another perpendicular to the frame main plane;

wherein the link follower penetrates into the control link;

wherein due to the lift-off drive movement of the leaf-side drive element, the control link and the link follower are movable relative to one another in the longitudinal direction of the control link and as a result the leaf-side transverse guide part can be moved relative to the fixed frame-side transverse guide part from a position associated with the position of the leaf close to the fixed frame perpendicular to the frame main plane into a lifting-off position associated with the position of the leaf away from the fixed frame due to the course of the control link guiding the link follower; and wherein the longitudinal guide of the fitting assembly comprises a fixed-frame-side longitudinal guide path which extends in the shifting direction of the leaf and on which the fixed-frame-side transverse guide part is movably guided in the shifting direction of the leaf together with the leaf-side transverse guide part which is moved into the lifting-off position;

wherein a spring element is arranged between the leaf-side transverse guide part and the fixed-frame-side transverse guide part, which is pre-tensioned perpendicular to the frame main plane when the leaf-side transverse guide part is in the lifted-off position; and in that under the action of the pre-tensioned spring element the link follower of the leaf lift-off control and one of the link walls of the control link of the leaf lift-off control are pre-tensioned against each other perpendicular to the frame main plane.

2. The fitting assembly according to claim 1, wherein the spring element is configured to be pre-tensioned between the leaf-side transverse guide part and the fixed-frame-side transverse guide part wherein the leaf-side transverse guide part can be positioned relative to the fixed-frame-side transverse guide part due to the lift-off drive movement of the leaf-side drive element of the lift-off drive.

3. The fitting assembly according to claim 1, wherein the leaf-side transverse guide part has a base body and a spring support which is structurally separate from the base body and connected to the base body, wherein the leaf-side transverse guide part is movably guided on the fixed-frame-side transverse guide part in the lifting-off direction by the base body and wherein the spring element arranged between the leaf-side transverse guide part and the fixed-frame-side transverse guide part is pre-tensioned between the spring support of the leaf-side transverse guide part and the fixed frame-side transverse guide part perpendicular to the frame main plane when the leaf-side transverse guide part is in the lifting-off position.

4. The fitting assembly according to claim 1, wherein the leaf-side control element of the leaf lift-off controller connected to the leaf-side drive element of the lift-off drive is designed as a guide follower, being a control pin, and the control element of the leaf lift-off controller provided on the fixed-frame-side transverse guide part is designed as a control link, and wherein the control link extends longitudinally in the direction of the lift-off drive movement of the leaf-side drive element of the lift-off drive with increasing distance from the frame main plane.

5. The fitting assembly according to claim 1, wherein a drive rod is provided as the leaf-side drive element of the lift-off drive, which drive rod is designed for guided movement on the leaf with the lift-off drive movement along the frame main plane.

6. The fitting assembly according to claim 1, wherein the spring element between the leaf-side transverse guide part and the fixed-frame-side transverse guide part is designed as a helical spring which has a screw axis extending perpendicular to the frame main plane and which is supported with axial ends on the one hand on the leaf-side transverse guide part and on the other hand on the fixed-frame-side transverse guide part.

7. The fitting assembly according to claim 1, wherein the spring element between the leaf-side transverse guide part and the fixed-frame-side transverse guide part is designed as a leaf spring which is attached to the leaf-side transverse guide part or to the fixed-frame-side transverse guide part.

8. A window or door, comprising:

a fixed frame and a leaf and with a fitting assembly which is arranged between the fixed frame and the leaf, wherein by means of the fitting assembly: the leaf is configured to be driven relative to the fixed frame with a guided lifting-off movement in a lifting-off direction perpendicular to a frame main plane of the fixed frame and can be lifted off from a position close to the fixed frame to a position away from the fixed frame; and the leaf lifted off into the position away from the fixed frame can be moved relative to the fixed frame with a guided shifting movement in a shifting direction perpendicular to the lifting-off direction along the frame main plane;

wherein the fitting assembly comprises a transverse guide, a lift-off drive and a longitudinal guide;

wherein the transverse guide of the fitting assembly has a leaf-side transverse guide part and a fixed-frame-side transverse guide part, and the leaf-side transverse guide part is connected to the leaf to be movable jointly with the leaf moving in the lifting-off direction and is movably guided on the fixed-frame-side transverse guide part in the lifting-off direction of the leaf;

wherein the lift-off drive of the fitting assembly comprises a leaf-side drive element and a leaf lift-off controller;

wherein the leaf-side drive element of the lift-off drive is connected to the leaf so as to be movable jointly with the leaf moving in the lifting-off direction (8) and is movable relative to the leaf with a lift-off drive movement;

wherein the leaf lift-off controller comprises a leaf-side control element connected to the leaf-side drive element and a guide-part-side control element provided on the fixed-frame-side transverse guide part;

wherein of the leaf-side control element and the guide-part-side control element of the leaf lift-off controller, one control element is designed as a control link and the other control element is designed as a link follower guided by means of the control link;

wherein the control link of the leaf lift-off controller extends with a longitudinal direction thereof along the frame main plane and at a varying distance from the frame main plane and has link walls extending along the frame main plane, which link walls are spaced apart from one another perpendicular to the frame main plane;

wherein the link follower penetrates into the control link; and wherein due to the lift-off drive movement of the leaf-side drive element, the control link and the link follower are movable relative to one another in the longitudinal direction of the control link and, thus, due to the course of the control link guiding the link follower, the leaf can be lifted off from the position close to the fixed frame to the position away from the fixed frame, wherein the leaf-side transverse guide part can be moved relative to the fixed-frame-side transverse guide part from a position associated with the position of the leaf close to the fixed frame to a lifting-off position associated with the position of the leaf away from the fixed frame; and wherein the longitudinal guide of the fitting assembly comprises a fixed-frame-side longitudinal guide path which extends in the shifting direction of the leaf and on which the fixed-frame-side transverse guide part is movably guided in the shifting direction of the leaf together with the leaf-side transverse guide part moved into the lifting-off position and the leaf moved into the position away from the fixed frame;

wherein a spring element is arranged between the leaf-side transverse guide part and the fixed-frame-side transverse guide part, which spring element is pre-tensioned perpendicular to the frame main plane when the leaf-side transverse guide part is in the lifted-off position and the leaf is in the position away from the fixed frame; and wherein under the action of the pre-tensioned spring element the link follower of the leaf lift-off control and one of the link walls of the control link of the leaf lift-off control are pre-tensioned against each other perpendicular to the frame main plane.

9. The window or door according to claim 8, including a drive rod provided as the leaf-side drive element of the lift-off drive, which drive rod is designed for guided movement on the leaf with the lift-off drive movement along the frame main plane, wherein the drive rod of the lift-off drive is movably guided on the leaf along the frame main plane in a leaf-side guide groove which has guide groove walls extending along the frame main plane and spaced apart from one another perpendicular to the frame main plane; and wherein under the action of the pre-tensioned spring element the drive rod and one of the guide groove walls of the leaf-side guide groove are pre-tensioned against each other.

* * * * *